UNITED STATES PATENT OFFICE.

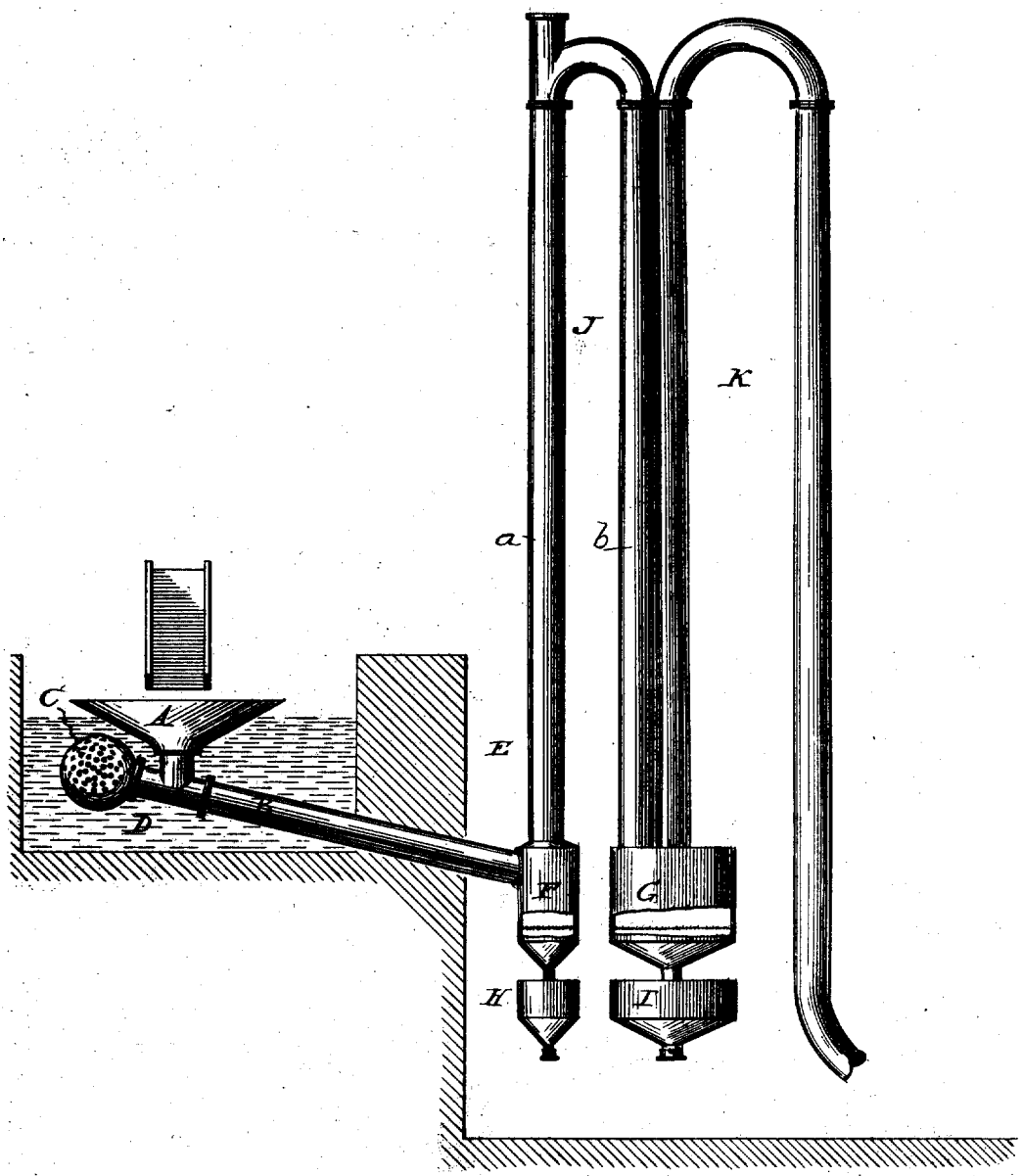

JOHN E. COLEMAN, OF SPOKANE, WASHINGTON.

ART OR METHOD OF MINING.

SPECIFICATION forming part of Letters Patent No. 689,167, dated December 17, 1901.

Application filed July 26, 1900. Serial No. 24,908. (No specimens.)

*To all whom it may concern:*

Be it known that I, JOHN E. COLEMAN, a citizen of the United States, residing at Spokane, in the county of Spokane and State of Washington, have invented certain new and useful Improvements in the Art or Method of Mining, of which the following is a specification.

My invention pertains to the separation of bodies of different specific gravity; and it consists, essentially, in agitating the mass of material by water and lifting off and carrying away from the mass by siphonic action all particles of less than predetermined specific gravity.

The apparatus by which the art or method is carried out may be varied within quite wide limits and is made the subject of another application of even date herewith, designated by Serial No. 24,907; but one embodiment thereof is illustrated in the accompanying drawing merely for greater facility of explanation of the art or method which alone is claimed herein.

Preliminarily, it may be well to consider, briefly, certain systems or modes of separation hitherto proposed or employed and to point out what are found in practice to be radical and vital distinctions between them and the present plan.

The system, art, or method here set forth is designed, primarily, for recovering gold, platinum, and like rare or precious metals from "placer" deposits, though by no means restricted thereto. The more common or usual mode of working such deposits is to wash or throw down in any convenient way the sand, gravel, clay, or earth bearing the metal wanted, causing the same to be mixed with and carried by water to a sluice or trough provided with riffle-boards, ribs, or other form of ridges, or with pockets or channels to cause a lodgment of the heavier matters. The pockets or gathering places may be supplied with mercury, which, taking up gold or silver, or both, holds the same and effects or greatly facilitates separation from sand, gravel, and other undesired bodies or matters. Frequently the matters collected in riffles are subsequently panned, passed through amalgamators, or otherwise treated to secure their valuable contents. Another mode of effecting separation and recovering the valuable metals consists in passing them in a water current along a trough, through the bottom of which water is forced upward at intervals, the force of the upwardly-moving water column being nicely regulated with a view to preventing descent into collecting-chambers beneath of any particles of less than predetermined specific gravity. Still another plan consists in imparting to a body of water charged with metal-bearing earth, sand, gravel, or the like a whirling motion, with a view to throwing off to different distances and into different receptacles the bodies of different specific gravity, thereby separating and grading the same. In all these prior plans and under all kindred systems of which I have knowledge the bodies under treatment are at all times in the midst of and subject to the full carrying force of the moving water current or column, and hence liable to be lifted and carried along as a mass without due opportunity for the heavier particles effectively, thoroughly, and properly to separate out of such mass. It is also found that with vertically-moving water columns there is frequently a much stronger upward movement at one point or in one portion of the column than at or in another, and, in fact, that there is not infrequently a downward movement in one portion of the column and an upward movement in another.

Through extended investigation it has been clearly ascertained that none of the prior plans noted has served to effect that close, delicate, and perfect separation essential to the profitable working of relatively poor deposits or to the recovery of substantially all the valuable metals of richer deposits.

The present plan differs from all others of which I am aware in that it simply lifts off from the top or upper part of the body within the separating-chamber those lighter bodies which are within the lifting capacity of the ascending column, leaving the heavier bodies or particles free to settle to the bottom of the chamber and to pass out of the field of more violent agitation. All the contents of the separating-chamber are or may be, however, subject to some agitation in order to permit all the particles of less specific gravity than those desired to separate out of and to part from the valuable matters, such lighter particles being also gradually carried upward into the level of more active agitation by the settling of the heavier particles, and consequent displacement of the lighter.

The foregoing is believed to state correctly the principle and mode of operation of the apparatus and is based upon observations made through transparent separating-chamber walls; but whatever be the correct theory or explanation it has been clearly demonstrated that the siphonic action effects a separation vastly closer and more delicate than has been found possible with other apparatus or by other methods.

Referring now to the drawing, I will describe a simple apparatus for carrying out the mode or art above explained.

A indicates a hopper designed to receive sand, gravel, earth, or the like carrying particles of free gold, platinum, or the like, which hopper has at its apex an outlet-opening into a pipe B. One end of pipe B extends beyond the hopper and terminates in a perforated bulb or strainer C, which is designed to be always immersed in or covered by water, for which purpose the whole of the hopper and the body of the pipe are arranged within a pit or water-chamber D. Pipe B passes through a wall of the chamber D to a second chamber E, wherein is placed a separating drum or vessel F, or preferably two such drums, the second one being indicated by the letter G. Pipe B may open into drum F radially or obliquely, as preferred, the radial arrangement being, however, deemed best ordinarily.

The chamber F and also chamber G will preferably be of cylindrical form, though a polygonal section is permissible and in some cases advantageous in reducing the tendency to rotary motion of the contents.

Beneath the main chamber F is a secondary settling and collecting chamber H, and beneath chamber G is a similar collecting-chamber I, either or both of which may be omitted at the option of the user.

From the top of chamber F there rises the ascending leg $a$ of a siphon J, the descending leg of which may pass to any convenient point sufficiently lower than the intake to insure a current of proper strength through the siphon when duly filled and started in action. The limits of siphonic action with water as the medium are of course well established and understood; but it is not necessary nor desirable ordinarily to reach or to approach very closely to this limit. In practice it will be desirable to render the level of the discharge capable of variation to adapt the apparatus to treatment of substances of differing specific gravity. As indicated, discharge-leg $b$ may deliver its stream directly upon the ground, into the bed of a stream, or elsewhere; but I prefer to have it deliver in the second chamber G, so that the material passing chamber F may be again acted upon.

It has been found advantageous to introduce the leg $b$ into chamber G through the top, as thereby the water works down into and through the mass of material collecting within chamber G and agitates or loosens up the same sufficiently to permit the heavier particles to descend and the lighter ones to work to the top and to be carried off by the moving current. From the top and preferably from the center of chamber G a second siphon K passes upward to a suitable height and thence downward to a level suitably below that of chamber G.

Chambers H and I are separated from chambers F and G, respectively, by fine screens or gratings, which allow only small particles or finely-divided matter to pass into the lower chambers. Hence the material collecting therein will be found to consist mainly of the richer and more valuable matters recovered.

The action of the apparatus is as follows: Hopper A is kept constantly supplied with sand, gravel, or earth carrying the matters to be recovered, and from the hopper it is delivered into pipe B, into which water is drawn in quantity sufficient to make a fluid mixture and to produce a fluid column sufficient to fill pipe B. From said pipe the material passes into separating-chamber F, in which it is subjected to agitation due to the movement of the water column, the heavier particles working constantly downward toward the bottom of the mass and settling in the bottom of the chamber or descending into chamber H. From the top of chamber F the water column ascends to the top of the siphon, passing thence into the longer descending leg $b$, the fall of water in which maintains the inflow of water through pipe B and uptake $a$. The water passes from the leg $b$ to an outlet at a proper level, or instead of passing directly from the leg $b$ of the first siphon it may, as shown, be discharged into a second chamber G, and from said chamber G by a second siphon. By properly determining the height of the ascending leg or the relative lengths of the ascending and descending legs of the siphon the strength of the current through the apparatus may be accurately gaged and made constant, and herein resides the great value and superiority of the mode of action described, since the apparatus can operate only when there is a full column of water, and must then act with absolute uniformity so long as the relative lengths of the siphon-legs remain unchanged. In this way after once properly adjusting the apparatus it is automatic and unvarying in its action, provided only that the hopper be properly supplied and the water-supply be maintained.

No claim is made herein to the apparatus per se.

Having thus described my invention, what I claim is—

1. The art or method of effecting separation of bodies of different specific gravity, which consists in mixing the same with a suitable liquid, agitating the mass, and applying suction to the upper part of the mass by means of a siphon, the intake and outlet of which are located at such relative levels as to cause the siphon-current to carry off all matters of less than predetermined specific gravity and to leave behind all others.

2. The art or method of separating bodies of differing specific gravity, which consists in continuously delivering into a tight chamber at a point above its bottom, a supply of the matters to be treated and a supply of liquid, and maintaining a flow of liquid from the upper part of said chamber by siphonic action.

3. The art or method of separating bodies or matters of differing specific gravity which consists, first, in introducing the same together with a liquid into a tight chamber and thereby agitating and rendering them capable of flowing in a stream or column; and second, in constanly drawing off from the upper part of the mass the liquid and the matters in suspension therein, by siphonic action, whereby the character of the bodies carried away is made directly dependent upon their relatively slight specific gravity and consequent incapacity to withstand the siphonic action, while heavier bodies resist such action and remain behind.

In testimony whereof I have signed my name to this specification in the presence of two subscribing witnesses.

JOHN E. COLEMAN.

Witnesses:
O. M. CHACE,
WILLIAM W. DODGE.